United States Patent [19]

Hara et al.

[11] Patent Number: 4,803,682
[45] Date of Patent: Feb. 7, 1989

[54] RESETTING SYSTEM

[75] Inventors: Seiji Hara; Satoshi Kobayashi, both of Saitama, Japan

[73] Assignee: Sanyo Electric Co., Ltd., Osaka, Japan

[21] Appl. No.: 707,609

[22] Filed: Mar. 4, 1985

[51] Int. Cl.⁴ .............................. G06F 11/00
[52] U.S. Cl. ............................. 371/12; 371/62; 364/200
[58] Field of Search ........ 364/131, 132, 200 MS File, 364/900 MS File, 183, 184; 371/33, 62, 12

[56] References Cited

U.S. PATENT DOCUMENTS

| 4,319,336 | 3/1982 | Anderson et al. | 364/200 |
| 4,363,092 | 12/1982 | Abo et al. | 364/200 |
| 4,405,951 | 9/1983 | Omori et al. | 364/900 |
| 4,512,019 | 4/1985 | Bodig et al. | 371/12 |
| 4,531,198 | 7/1985 | Matsuda | 371/12 |
| 4,538,273 | 8/1985 | Lasser | 371/62 |
| 4,541,050 | 9/1985 | Honda et al. | 371/12 |
| 4,553,204 | 11/1985 | Hashimoto | 371/12 |
| 4,562,544 | 12/1985 | Bonitz et al. | 371/12 |
| 4,567,560 | 1/1986 | Polis et al. | 364/132 |
| 4,586,179 | 4/1986 | Sirazi et al. | 371/12 |
| 4,597,052 | 6/1986 | Matsuda | 364/200 |
| 4,618,953 | 10/1986 | Daniels et al. | 371/62 |
| 4,625,274 | 11/1986 | Schroeder | 364/200 |
| 4,683,568 | 7/1987 | Urban | 371/12 |
| 4,696,002 | 9/1987 | Schleupen et al. | 371/12 |

FOREIGN PATENT DOCUMENTS

| 0138149 | 10/1980 | Japan | 371/12 |
| 0087558 | 5/1984 | Japan | 371/12 |
| 0167017 | 8/1985 | Japan | 371/12 |

Primary Examiner—Gareth D. Shaw
Assistant Examiner—Viet Q. Nguyen
Attorney, Agent, or Firm—Birch, Stewart, Kolasch & Birch

[57] ABSTRACT

A resetting system including a main CPU for an apparatus, and a slave CPU for controlling a terminal portion of the apparatus in association with a watch-dog timer, wherein the main CPU outputs for a predetermined period of time a strobe signal to be supplied to the watch-dog timer, which outputs a reset signal for resetting both the main CPU and slave CPU when the periodical supplying of strobe signals is stopped, indicating an abnormal state of the main CPU. The slave CPU sends a response data corresponding to a command from the main CPU, whereby the main CPU judges as a communication error a response data not in conformity with a predetermined format and, upon the generation of a number of communication errors in succession, the slave CPU is reset by a reset signal outputted from the main CPU.

8 Claims, 7 Drawing Sheets

Fig. 2
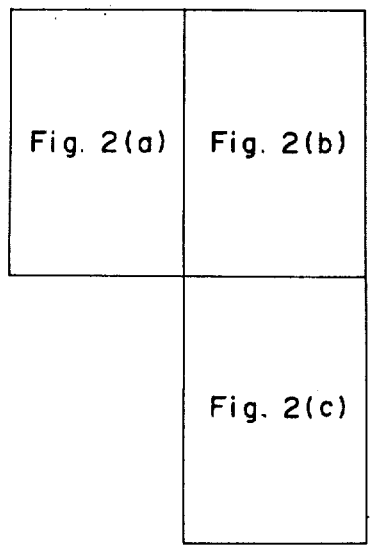
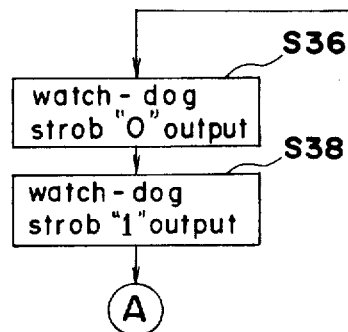
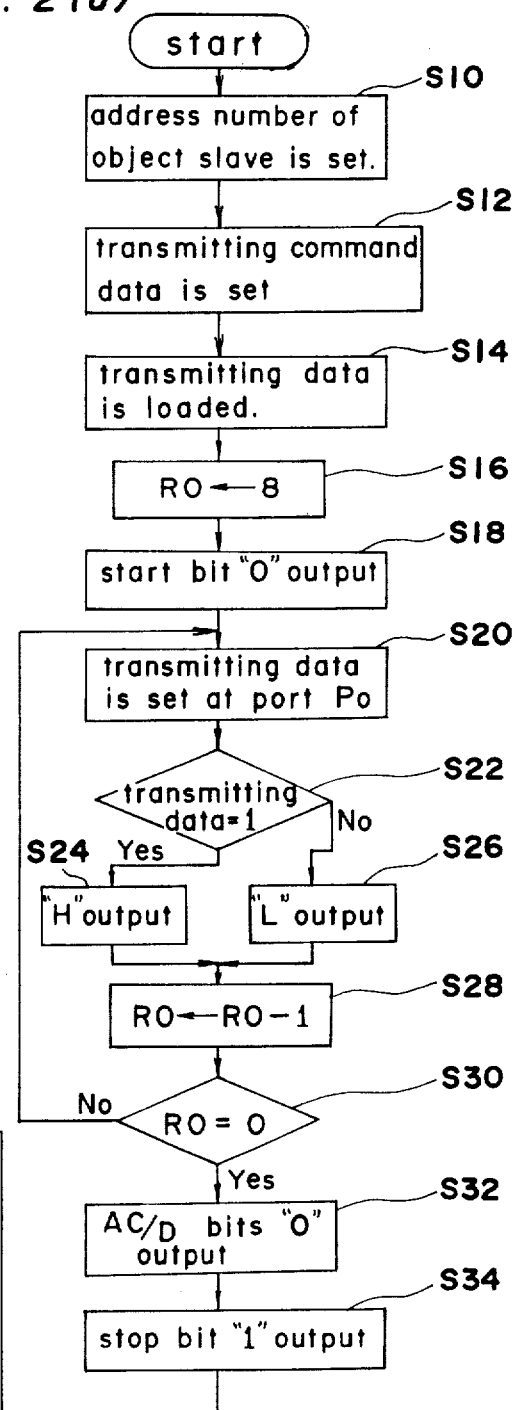
Fig. 2(a)

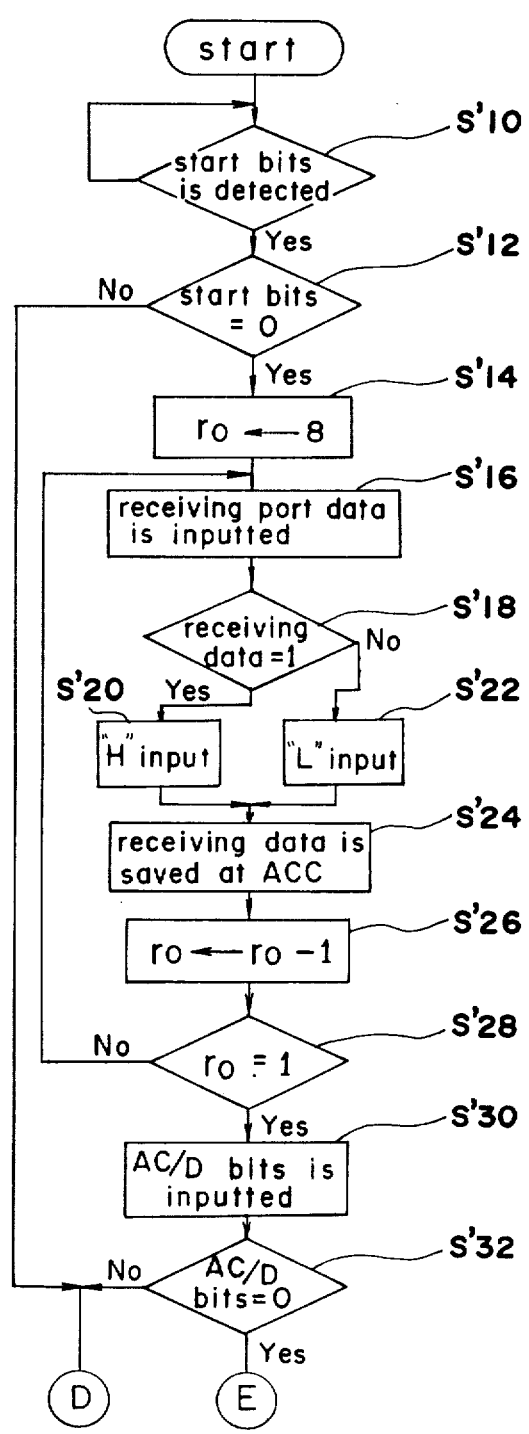

Fig. 4
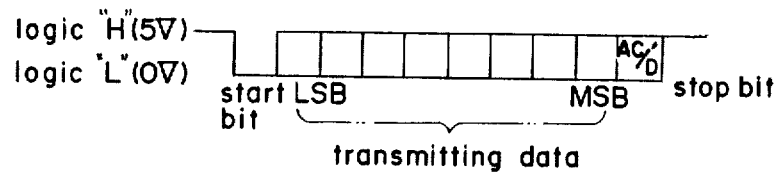
Fig. 5
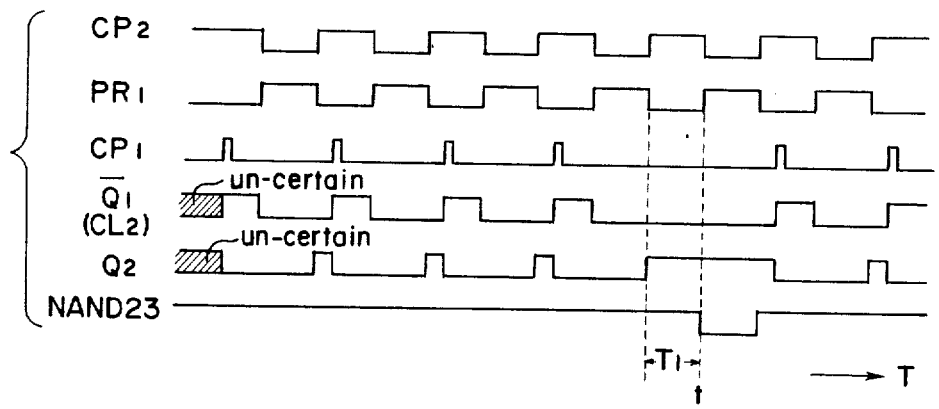
Fig. 6
| CL | PR | D | CP△ | Qn+1 | Q̄n+1 |
|----|----|----|-----|------|-------|
| L  | H  | ※ | ※  | H    | L     |
| H  | L  | ※ | ※  | L    | H     |
| H  | H  | ※ | ※  | L    | H     |
| L  | L  | L | ↑   | L    | H     |
| L  | L  | H | ↑   | H    | L     |
| L  | L  | X | ↓   | Qn•  | Q̄n•   |
note  ※ : Dont Care
      • : No Change
      △ : Level Change

RESETTING SYSTEM

BACKGROUND OF THE INVENTION

The present invention relates to a resetting system in an apparatus provided with a main CPU for controlling the whole system and slave CPUs for effecting processing at each of a plurality of terminals.

In developing control by CPUs employed in such apparatus as automatic vending machines or the like, the number of inputs and outputs from a control section of the CPUs becomes so large that partial weight is inevitably placed on this control section for the purpose of developing and improving quality of the CPUs, resulting in high integration density of a substrate accommodating the CPUs thereon, and accordingly, it becomes disadvantageous that not only wiring processing becomes complicated, but also it takes time to detect exactly where an error or a break-down takes place. Therefore, it is considered effective to provide, in addition to the main CPU which controls the whole operation of the apparatus, slave CPUs for effecting processings corresponding to respective terminals for each of a plurality of functional blocks. This is advantageous in that additional improvement in function of the apparatus can be simultaneously achieved. In this case, the main CPU designates an operation mode for the slave CPUs, and at the same time, it performs "give and take" of data with the slave CPUs to put the apparatus in operation. However, in the case where an accident or an error takes place in either one of the CPUs, it becomes serious how effectively a plurality of the CPUs are subjected to the resetting system.

DESCRIPTION OF THE PRIOR ART

A watchdog timer has been known as a device for detecting an error in a system employing CPUs. One example of such device as referred to above is disclosed in, for example, Japanese Patent Publication (Tokkosho) No. 6461/1979 published Mar. 28, 1979. The watchdog timer is actuated in that it is triggered one by one by strobe signals generated by a CPU at a predetermined cycle in accordance with the progress of a program, and when a predetermined time is passed, with no strobe signals being generated, it produces a reset signal to the CPU. It has conventionally been practiced that such a watchdog timer as described above is provided for each CPU in a system having a plurality of CPUs, thus resulting in expensiveness of the system.

SUMMARY OF THE INVENTION

Accordingly, an essential object of the present invention is to provide an improved resetting system which is able to achieve an effective system resetting by providing a breakdown detection circuit only with a main microcomputer.

Another object of the present invention is to provide an improved resetting system which enables an effective resetting by the use of a single watchdog timer in a system provided with a plurality of CPUs.

A further object of the present invention is to provide such improved resetting system as described above which effects resetting by positively detecting an error in slave CPUs by a main CPU.

In accomplishing these and other objects of the present invention, there is provided a resetting system in an apparatus provided with a main CPU for controlling the whole of the system therein and slave CPUs for effecting processing at each of a plurality of terminals, comprising; a programming unit accommodating such instructions therein that said main CPU generates strobe signals at a predetermined cycle; a watchdog timer which is connected to said main CPU for said strobe signals to be supplied, and which outputs an error signal so as to reset said main CPU when said strobe signals are not generated; and a control means for controlling the introduction of a reset signal to said slave CPUs, said control means being so designed as to introduce said reset signal into said slave CPUs on the basis of the generation of said error signal.

According to the present invention, the watchdog timer is arranged to detect an error in the main CPU, and to reset all of the CPUs by outputs thereof in the case where an error is detected. Therefore, in accordance with the resetting system of the present invention, since both the main CPU and the slave CPUs are initialized together, there is no possibility that any error should be given rise to in the respective processings of the main and slave CPUs after the release of the resetting.

Furthermore, in accomplishing the above-described objects of the present invention, the main CPU is designed to detect an error in the slave CPUs through communication therewith. Therefore, according to the present invention, means for detection of an error in each of the slave CPUs is not required.

Moreover, according to the present invention, in the case where some error or failure is detected in the slave CPU, a reset signal is introduced into the slave CPU by the control of the main CPU. Therefore, an effective resetting of the slave CPU by the main CPU, without complicated structure of the system, can be achieved.

BRIEF DESCRIPTION OF THE DRAWINGS

These and other objects and features of the present invention will become apparent from the following description taken in conjunction with the preferred embodiment thereof with reference to the accompanying drawings, in which;

FIG. 4 is a format showing the series of bits to be transmitted, FIG. 5 is a time chart showing the operation of a watchdog timer employed in the resetting system of the present invention, and FIG. 6 is a table showing true, real values of a D-type flip-flop.

DESCRIPTION OF THE EMBODIMENT

Figure 1:
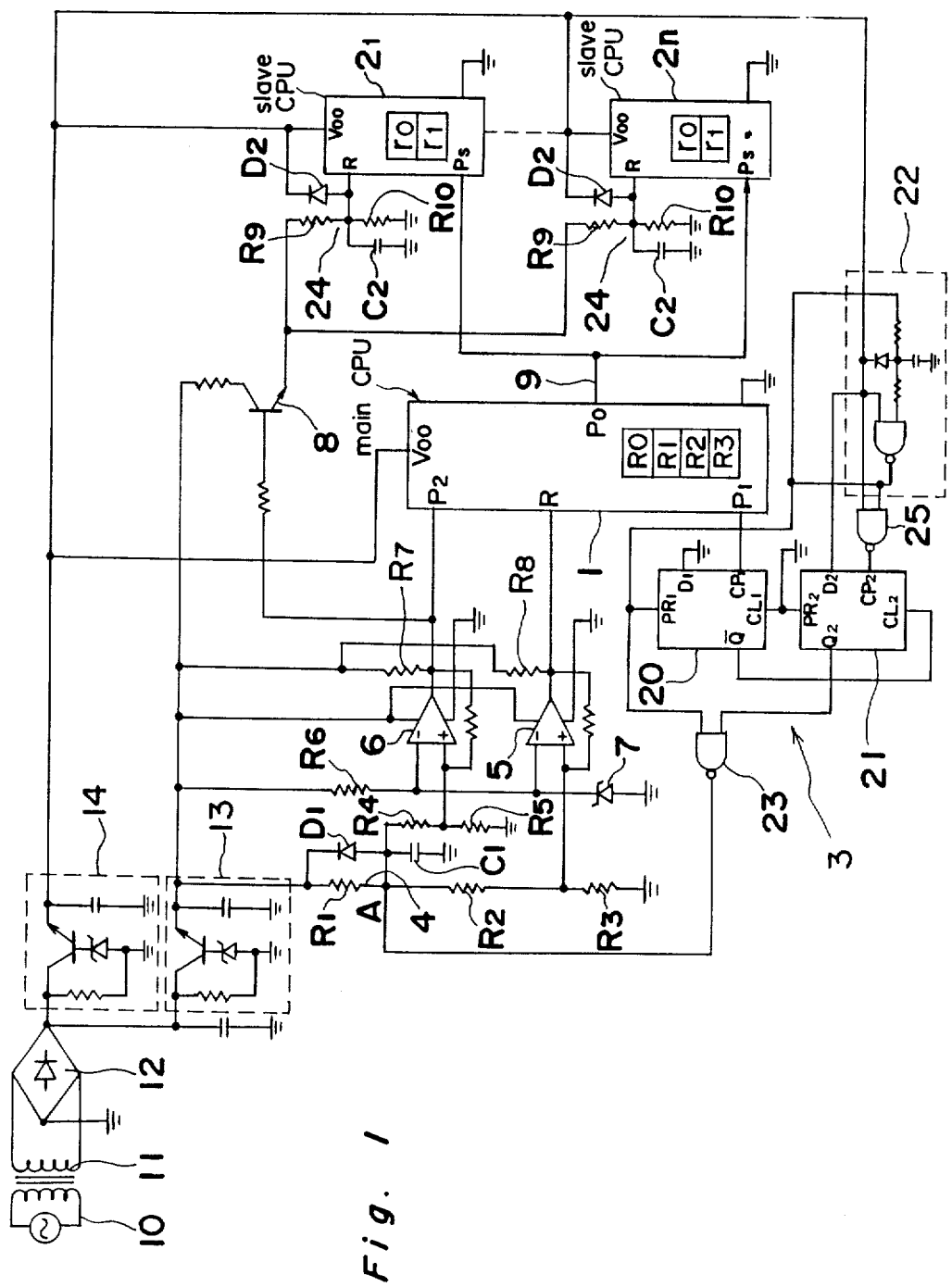
FIG. 1 is a circuit diagram of a resetting system according to one preferred embodiment of the present invention, FIG. 2, (a) to (c), is a flow-chart showing the operation of a main CPU of the resetting system of FIG. 1, FIG. 3, (a) and (b), is a flow-chart indicative of the operation of a slave CPU of the resetting system.

Before the description of the present invention proceeds, it is to be noted that like parts are designated by like reference numerals throughout the accompanying drawings.

Referring to FIG. 1, an AC power source 10 is, after having been dropped in voltage by a transformer 11, rectified by a rectifier circuit 12. A stabilized power circuit 13 supplies a stabilized power of 26V. Another stabilized power circuit 14 supplies a stabilized power of 5V. Each terminal of a main CPU and slave CPUs $2_1$, ... $2_n$ is connected to the stabilized power circuit 14. The main CPU 1 controls the whole system, while the slave CPUs $2_1, \ldots 2_n$ control each of the terminals, respectively. The main CPU 1 is connected with each of the slave CPUs $2_1, \ldots 2_n$ through a common transmission line 9, controlling the operation of the system by communication of command or data with the slave CPUs through the common transmission line 9. An integrated circuit 4 comprising a resistor R1 and a capacitor C1 is connected to the stabilized power circuit 13. A potential at a junction A between the resistor R1 and the capacitor C1 is divided by resistors R2 and R3 to be applied to a (+) input terminal of a comparator 5, while the potential at the junction A divided by resistors R4 and R5 is applied to a (+) input terminal of a comparator 6. A diode D1 is disposed so as to discharge voltage from the capacitor C1 when the power supply is cut off. And, to (−) input terminals of the comparators 5 and 6 is applied a zener voltage VZ by a zener diode 7 which is connected to the stabilized power circuit 13. Moreover, an output terminal of the comparator 5 is connected to a reset terminal R of the main CPU 1, while an output terminal of the comparator 6 is connected, together with an output port P2 of the main CPU 1, to the base of a transistor 8. These output terminals of the comparators 5 and 6 are further connected to the stabilized power circuit 14 through pull-up resistors R7 and R8, respectively. The transistor 8 has its collector connected to the stabilized power circuit 13 and its emitter to a ground through resistors R9 and R10, which are provided in each of the slave CPUs $2_1, \ldots 2_n$.

In the case where a strobe signal is not generated at each predetermined cycle from an output port P1 of the main CPU 1, a watch-dog timer 3 outputs an "L" level signal as an error detection signal. An output side of the watch-dog timer 3 is connected to the junction A. The watch-dog timer 3 is provided with a flip-flop 20 which connects a clock input CP1 to port P1 of the main CPU 1 and a flip-flop 21 which connects a Q1 output of the flip-flop 20 to a clear input CL2. A data input D1, the clear input CL1 of the flip-flop 20 and a preset input PR2 of the flip-flop 21 are respectively connected to ground. A vibrator 22 provided in the watch-dog timer 3 and generating pulses at an interval of 180 ms is connected at its output side to a preset input PR1 of the flip-flop 20 and, at the same time, it is connected, through NAND gate 25, to a clock input CP2 of the flip-flop 21.

Furthermore, the watch-dog timer 3 is provided with NAND gate 23 which receives two inputs of the output from the vibrator 22 and Q2 output from the flip-flop 21. An output terminal of the NAND gate 23 is connected to the junction A of the main CPU 1. The integrated circuit 24 comprised of the resistor R9 and the capacitor C2, is provided corresponding to the slave CPUs $2_1, \ldots 2_n$, being connected to the emitter of the transistor 8. A reset terminal R of the slave CPUs $2_1, \ldots 2_n$ is connected to a junction between the resistor R9 and the capacitor C2, which junction is connected to the stabilized power circuit 14 through a clamp diode D2, and simultaneously, to ground through the resistor R10.

In the construction as described above, upon turning on the AC power source 10, the main CPU 1 and the slave CPUs $2_1, \ldots 2_n$ are supplied with power necessary for operation from the stabilized power circuit 14. Meanwhile, since potential VA at junction A gradually rises in accordance with the time constant of the capacitor C1 and the resistor R1, the comparators 5 and 6 generate "L" level outputs, respectively. As a result, since the main CPU 1 has the reset terminal R at the "L" level, it is subjected to be reset. At this time, the transistor 8 is turned off since the comparator 6 generates "L" level output, and therefore, the respective integrated circuits 24 corresponding to the slave CPUs $2_1, \ldots 2_n$ are not supplied with power from the stabilized power circuit 13, thereby subjecting the slave CPUs to the resetting due to the "L" level at the reset terminal R thereof. However, when the potential VA at the junction A, after being divided by the resistors R2 and R3, exceeds the zener voltage VZ of Zener diode 7, the comparator 5 generates "H" level output to release the main CPU 1 from the resetting. Subsequently, when the potential VA at the junction A, after being divided by the resistors R4 and R5, exceeds the zener voltage VZ, the comparator 6 generates "H" level output to turn on the transistor 8, and the respective integral circuits 24 corresponding to the slave CPUs $2_1, \ldots 2_n$ are supplied with power from the stabilized power circuit 13.

After the delayed time, by the resistor R9 and the capacitor C2, the integrated circuits 24 are supplied with "H" level power (5V) to release the slave CPUs from the resetting. Accordingly, during the period that the main CPU 1 is released from the resetting until input-output ports thereof are set in the initial state in accordance with the program, the slave CPUs $2_1, \ldots 2_n$ are held in the reset state. Thus, when the initial resetting is released, the main CPU 1 and the slave CPUs $2_1, \ldots 2_n$ perform processing of the preliminarily-programmed instructions so as to control the system.

Hereinafter, the operation of the main CPU 1 and the slave CPUs $2_1, \ldots 2_n$ relative to the resetting operation of the system of the present invention will be described, but it will be done mainly with respect to the communication operation between the main CPU 1 and the slave CPUs $2_1, \ldots 2_n$.

Figure 2B:
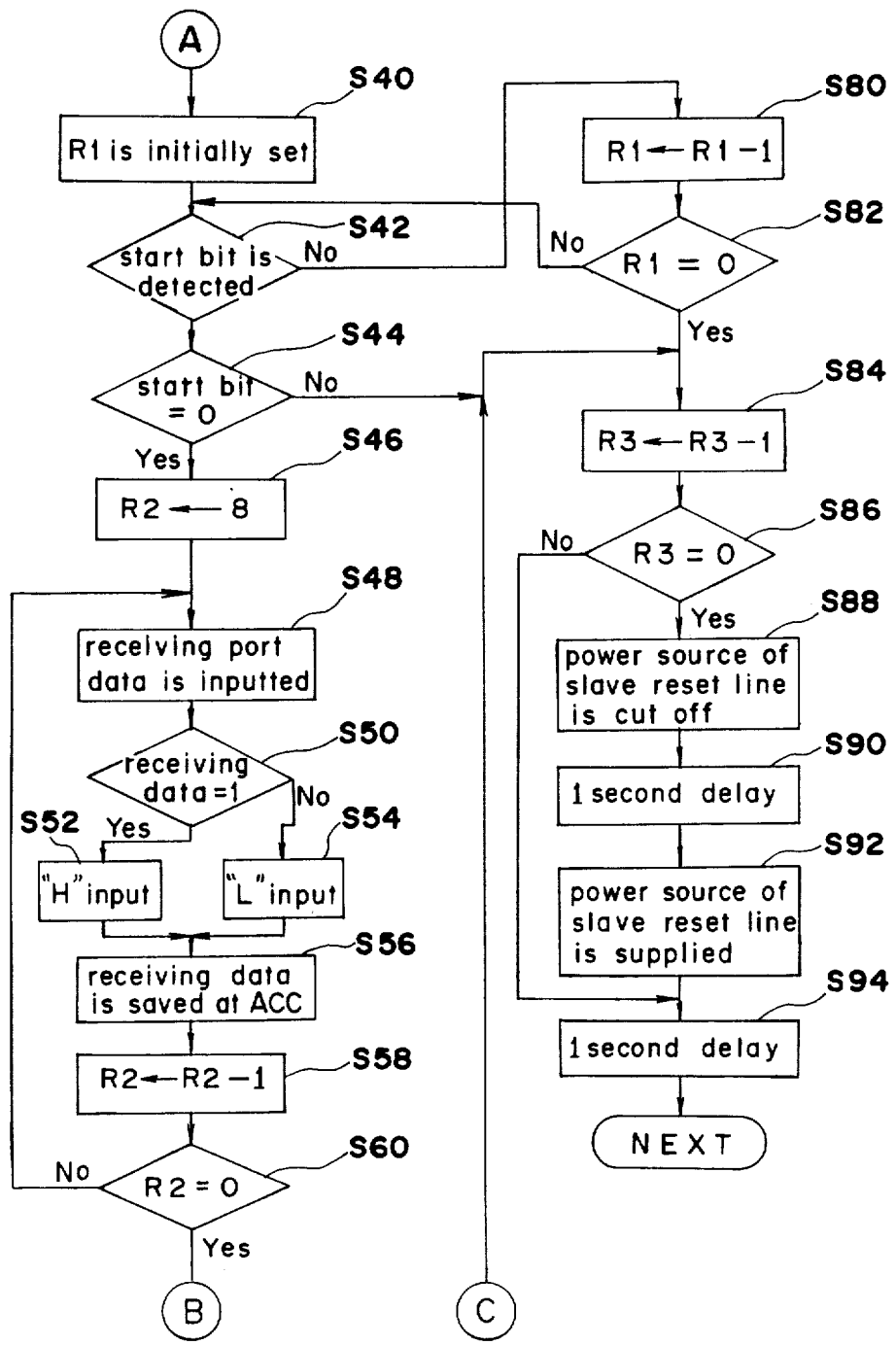
Figure 2C:
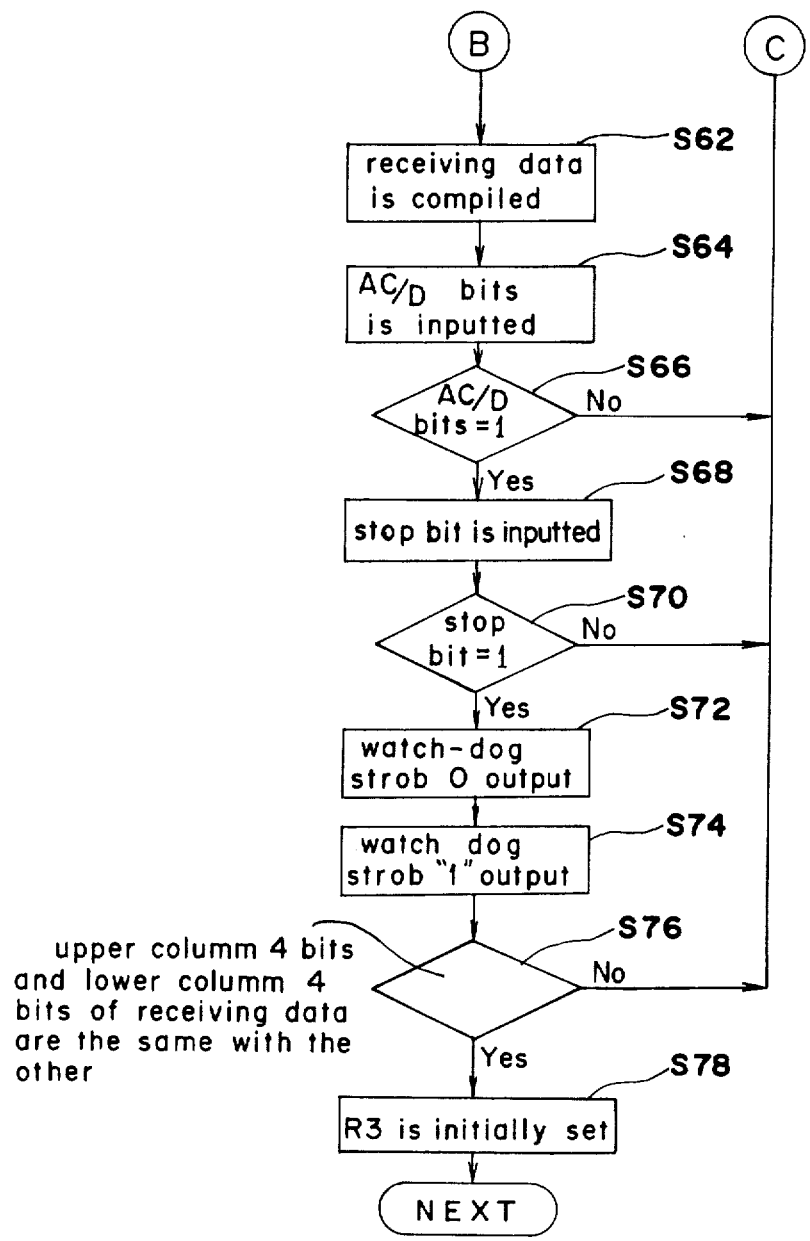

The operation of the main CPU 1 will be explained hereinafter with reference to a flow chart of FIG. 2.

At the first step S10 the address number of object slave CPUs to be communicated with is set. For instance, in communication with a slave CPU $2_1$, the address number 8 of this slave CPU $2_1$ is set at this step. At the step S12 the command representing an operation order to the slave CPU $2_1$ is set. For instance, if a command code to be transmitted is "0", the address command data, i.e., AC code is "10000000" in binary code, i.e., "80" in hexadecimal code, and at the step S14 the AC code 80 is loaded on an accumulator ACC to put the main CPU 1 into a state of transmitting. The system of this transmitting is a type of asynchronous half duplex serial transmission, and the bit allocation is 11 bits formation such that, as shown in FIG. 4, the transmitting data of 8 bits is added with each 1 bit of the start-stop bits and AC/D bits for controlling to distinguish about whether the start-stop bits of start-stop synchronizing and transmitting data are the AC code or data code.

At step S16, the main CPU 1 is loading "8" as a variable data bit number on an internal register to be used as a transmitting data counter.

At step S18, the start bit of L is outputted onto a transmitting line 9. As the transmitting data is transmitted in succession from the LSB, the data "0" of the 1 bit column is first set in the port Po at step S20.

At step S22, the judgment of whether the transmitting bit data is "1" or "0" is made, and according to the result, a signal of H or L is outputted at step S24 or step S26, respectively. In this case, as the data of the 1 bit column is "0", at step S26, a signal of L is outputted from the port Po.

At step S28, the content of register R0 is subtracted by 1 upon the transmission of 1 data bit, and at step S30, the judgment is made as to whether the content of R0 is "0" or not. This step is a stage having transmitted the data of the 1 bit column, and, in succession, the process from step S20 is repeated in order to transmit the data "0" of the 2 bit column. With the above, the data "0000" from the 1 bit column to the 4 bit column, i.e., the command code "0" is transmitted by repeating the process of steps S20, S22, S26, S28 and S30. On the other hand, as to the data "0001" from the 5 bit column to the 8 bit column, i.e., the address code "8", each data "0" from the 5 bit column to the 7 bit column is transmitted by repeating the process of steps S20, S22, S26, S28 and S30, and the data "1" of the 8 bit column is transmitted with the process of steps S20, S22 and S24. And, after transmitting the data of the 8 bit column, at step S28, the register R0 is subtracted and, if the content of register R0 is detected to be "0" at step S30, the stage is entered to step S32.

At step S32, as the data bit showing "80" is the AC code, a signal of "0" is outputted to the AC/D bit. And, at step S34, a signal of "1" is outputted to the stop bit to finish the transmitting operation. At step S36, the main CPU 1 is impressing an edge onto the watch-dog timer 3 while outputting a signal of "L" as a watch-dog strobe in order to indicate a state having been operated normally by itself.

At step S38, a signal of "H" is outputted onto the watch-dog timer 3 as the watch-dog strobe. If the main CPU 1 is practicing to repeat the program normally so as to output the watch-dog strobe periodically, the output of watch-dog timer 3 is maintained at "H" and the voltage at the connecting point A is held at a high level. Therefore, the output of comparator 5 is kept at "H", and the main CPU 1 is not brought into the state of reset. The operation of watch-dog timer 3 relating to the output of the watch-dog strobe by the main CPU 1 is mentioned later in detail.

Although the AC code "80" outputted from the port Po of the main CPU 1 is detected by all the slave CPUs $2_1, \ldots 2_n$, only the slave CPU $2_1$ corresponding to the AC code "8" is adapted to return the ACK data, the other slaves being rendered to ignore this AC code. At this time, the corresponding slave CPUs are operated to reply the ACK data within a certain period of time, for example, 4800 baud rate, by the AC code. The ACK data is a data of 8 bits, and the slave CPU $2_1$ is transmitting into the main CPU 1 the ACK data in addition to the start-stop bit and AC/D bit. Accordingly, the main CPU 1, having a regulation such that it regards the nondetection of the start bit within a certain period of time as a communication error, is setting an initial value in the internal register R1 to be used as a timer at step S40.

At step S42, this stage is adapted to detect the start bit and, if not detecting the start bit, the register R1 is subtracted by 1 at step S80. If not detecting the start bit even after expiration of a given time, it is regarded as an abnormal state to proceed from step S82 to step S84, but the slave CPU is designed to reply at any time so long as runaway has not occurred. Accordingly, the main CPU 1 can detect the start bit within a certain time in a normal situation.

Upon the detection of the start bit, the main CPU 1 is adapted to confirm again, at the middle portion of the transfer bit, whether it is the start bit or not. By this process, it can be distinguished as the start bit from the other simple noise and, if it is noise, the stage proceeds to step S84. If it is confirmed that it is the start bit, at step S46, a signal of "8" is loaded as a data bit number on the internal register R2 to be used as a receiving data counter in order to receive the data of 8 bits.

At step S48, the data bit of ISR transmitting from the slave CPU $2_1$ is inputted from the port Po. At step S50, upon making the judgment as to whether the inputted data is "1" or "0", if inputting a signal of "1", a signal of "H" is adapted as an input data at step S52 and, if inputting a signal of "0", a signal of "L" is adapted as an input data at step S54, and the receiving data is saved within an accumulator ACC at step S56.

At step S58, by receiving 1 bit data, the content of register R2 is subtracted by 1 and, at step S60, judgment is made as to whether the content of register R2 is "0" or not. This step is a stage having received the data of the 1 bit column and, in succession, the process from step S48 is repeated in order to receive the data of the 2 bit column.

The ACK data outputted from the slave CPU $2_1$ is represented with "10101010" in the binary code of 8 bits, i.e., "AA" in hexadecimal code and, if receiving "AA" as the data of ACK data, the main CPU 1 judges it as the ACK data from the slave CPU $2_1$. If receiving the data "0", such as signals of the 1 bit column, 3 bit column, 5 bit column, 7 bit column of the ACK data "AA", the main CPU 1 is processing in succession steps S48, S50, S54, S56, S58 and S60 and, if receiving the data "1", the main CPU 1 is processing in succession steps S48, S50, S54, S56, S58 and S60. And, after receiving the data of the 8 bit column, the content of register R2 is subtracted at step S58 and, if the content of register R2 is detected at "0" at step S60, the stage proceeds to step S62.

At step S62, the receiving bit data saved within the accumulator ACC is compiled to form a receiving data. At step S64, the AC/D bit is inputted and, at step S66, judgment is made as to whether the AC/D bit is "1" or not. As the ACK data is a kind of data, the slave CPU $2_1$ is outputting "1" into the AC/D bit normally. Accordingly, if detecting "0" at step S66, it is regarded as an abnormal state and the stage proceeds to step S84.

At step S68, the stop bit is inputted. At step S70, judgment is made as to whether the stop bit is "1" or not and, if it is "0", it is regarded as an abnormal state and proceeds to step S84. If detecting a signal of "1" onto the stop bit, in the same manner as the process of steps S36 and S38, the strobe signal "L" is outputted into the watch-dog timer 3 at step S72, and the strobe signal "H" is outputted into the watch-dog timer 3 at step S74.

At step S76, in comparison between the data of the lower column 4 bits and the data of the upper column 4 bits with respect to the receiving data, judgment as to whether or not they coincide with each other is made. In this case, the ACK data is adapted to coincide between the data of the lower column 4 bits and the data of the upper column 4 bits like as the "AA" and, if they are not coincident with each other, it is regarded as a communication error to proceed to step S84.

By the above process, the communication error, due to the existence of a random arrangement of transporting baud rate between the main CPU 1 and the slave CPU $2_1$, can be detected with high precision. If the right answer is given by the slave CPU $2_1$ to the AC code of the main CPU, the transfer of data is regarded as having been made normally, at step S78, the data of "100" is set within the internal register R3 to be used as a counter for counting the number of errors to return to the initial position, and it proceeds to the other process operation. In the case of being unable to transmit due to causing runaway of slave CPU $2_1$ or not establishing a communication, the process is made at step S84, wherein the content of register R3 is subtracted by 1.

The register R3 is memorized with "100" as an initial value, but, if generating an abnormal state, the content of this register R3 becomes 99 because it is not passing through the initial flow of the register R3 to be made at step S78.

At step S86, judgment is made as to whether the content of register R3 is "0" or not and, if the result is obtained except for "0", the stage proceeds to the other process operation. Accordingly, even if the communication with the slave CPU $2_1$ is abnormal, the main CPU 1 puts into practice the communication with the other slave CPUs and, also, keeps up the communication with the slave CPU $2_1$ disposed within the main loop. However, if such an abnormal communication is generated in succession more than 100 times, the main CPU 1 proceeds to step S88 in order to detect the content of register R3 being "0" by the judgment of step S86.

At step S88, the port P2 is rendered to "L" to make the transistor 8 off, and the power supply from the stable power source circuit 13 to the reset line of each slave CPU $2_1, \ldots 2_n$ is stopped. By this process, the reset terminal voltage of slave CPUs $2_1, \ldots 2_n$ is maintained in a state of reset to be a ground voltage. Since the charged voltage retained in the resistor R9 and capacitor C2 as shown in FIG. 1 is not discharged at once upon the stoppage of the power supply to the reset line, it is necessary to keep enough of a period of time for rendering the reset certain. Therefore, at step S90, the main CPU 1 is adapted only to generate the output of the strobe signal periodically for one second, and to stop other processing.

At step S92, the port P2 is rendered "H". For this process, the transistor 8 is turned on, and power is supplied again from the stable power source 13 to the reset line of slave CPUs $2_1, \ldots 2_n$. By this process, the slave CPUs $2_1, \ldots 2_n$ are brought into the initial state to begin the practice of normal order delivered from the certain absolute address, resulting in returning from the state of runaway.

Each of slave CPUs $2_1, \ldots 2_n$ needs a warm-up time for the employment of hardware components necessary for a given rise time. Accordingly, at step S94, the main CPU 1 is adapted to output only the strobe signal for one second, as in step S90.

Figure 3B:
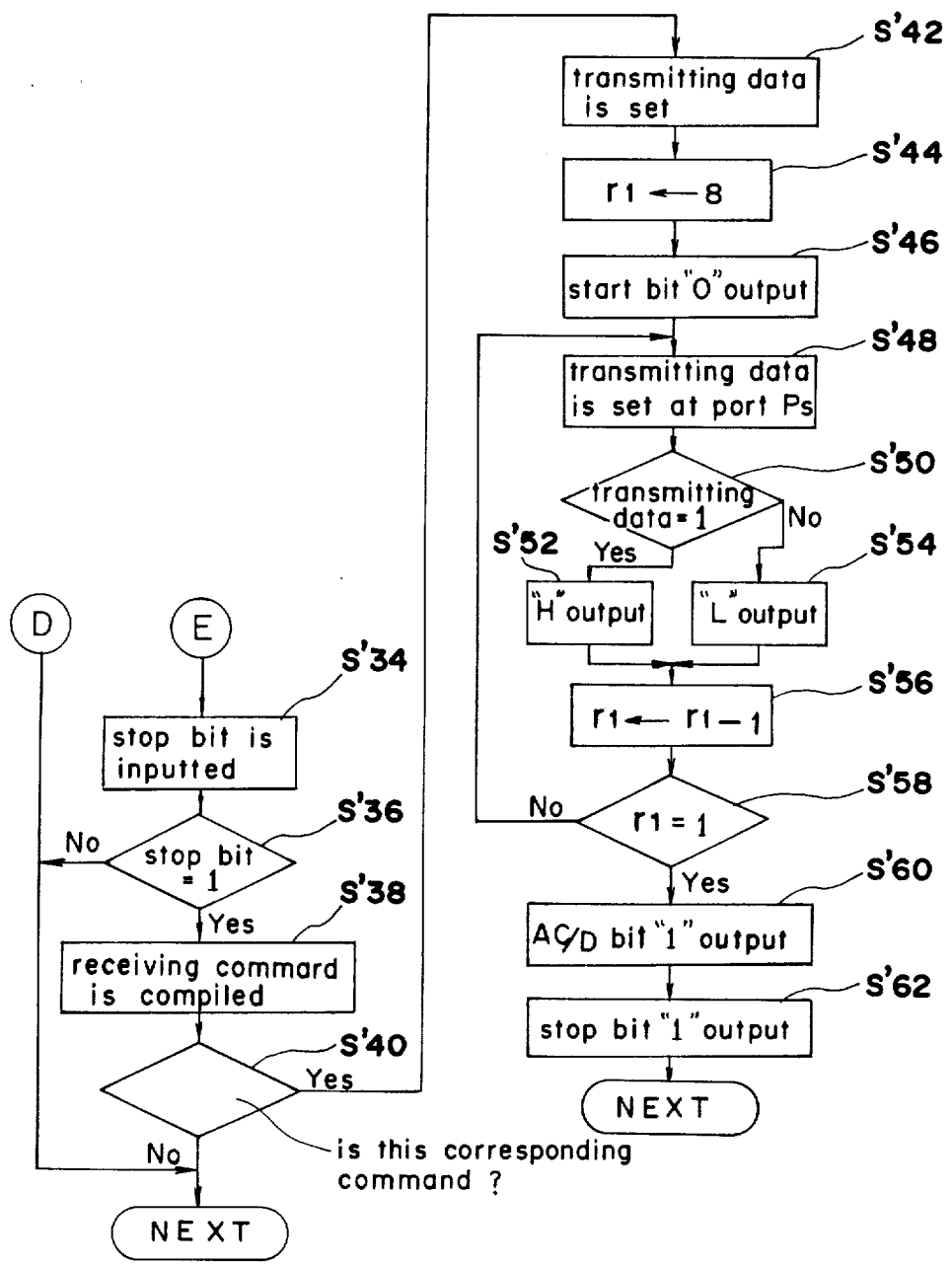

The communication operation of the slave CPUs $2_1, \ldots 2_n$ relating to that of the main CPU 1 will be explained hereinafter with reference to the flow chart of FIG. 3.

The communication operation of each slave CPU $2_1, \ldots 2_n$ is almost the same as that of the main CPU 1, but is made by the employment of an external interrupt and a timer interrupt for receiving the AC code and data from the main CPU 1 with certainty. The following explanation will be made in the case of the start bit being supplied from the main CPU 1.

At the first step S'10, to detect the start bit from the main CPU 1, the external interrupt is adapted to put on a state of enabling itself so as to be able to interrupt at any time.

At step S'12 proceeding by the detection of the start bit, in the middle portion of the transmitting bit, it is confirmed again as to whether a signal is the start bit or not.

At step S'14, the signal of "8" is loaded the internal register Ro to be used as a receiving data counter.

At step S'16, the AC code, being transferred from the main CPU 1, is inputted from the port Ps. At step S'18, judgment is made as to whether or not the inputted data is "1" or "0", and, if inputting a signal of "1", the signal of "H" is employed as an input data at step S'20; while, if inputting a signal of "0", the signal of "L" is employed as an input data at step S'22, resulting in that the receiving data is adapted to be saved within the accumulator ACC as step S'24.

At step S'26, by receiving the 1 data bit, the content of register ro is subtracted by 1 and, at step S'28, judgment is made as to whether or not the content of register ro is "0". This step is a stage of receiving the data of the 1 bit column, and, in succession, to receive the data of the 2 bit column, the process from step S'16 is repeated again.

As the AC code outputted from the main CPU 1 is represented with "10000000" in the binary code of 8 bits, i.e., "80" in the hexadecimal code, the slave CPUs $2_1, \ldots 2_n$ are adapted to process the datum 0 from the 1 bit column to the 7 bit column to repeat in succession steps S'16, S'18, S'22, S'24, S'26 and S'28 under receiving the datum thereof.

Also, in the case of receiving the data "1" of the 8 bit column, the slave CPUs $2_1, \ldots 2_n$ are applied to process steps S'16, S'18, S'20 and S'24 in succession, and to subtract the content of receiving counter ro by 1 at step S'26, and, if detecting the content of register ro as being "0" at step S'28, the stage proceeds to step S'30.

At step S'30, the AC/D code being transmitted at the next of the AC code is inputted under the state of should be "0", but, if detecting a signal of "1" at step S'32, this transmitted data is disregarded at the moment.

At step S'34, the stop bit is inputted and, at step S'36, after confirming whether this stop bit is "1" or not, this transmitted data is disregarded in the case of the stop bit being "0". As the main CPU 1 has confirmed the establishment of transmission, at step S'38, the receiving data is compiled.

At step S'40, in the confirmation for the address of the AC code, only the slave CPU $2_1$ is adapted to reply due to the address code being "8", but the other slave CPUs are adapted to disregard this AC code in a given program. Therefore, the slave CPU $2_1$ corresponding to the address code "8" will be made the following process, excluding the other slave CPUs being adapted to make another process operation.

At step S'42, the slave CPU $2_1$ is loading the communication data onto the accumulator ACC in order to return the ACK data. As mentioned above, the ACK data of the slave CPU $2_1$ is represented with "10101010" in the binary code of 8 bits, i.e., "AA" in the hexadecimal code, and is transmitting in addition to the start-stop bit and the AC/D bit.

At step S'44, the signal of "8" is loaded within the internal register r1 to be used as a transmitting data counter.

At step S'46, the start bit of "L" is outputted into a transmitting line 9. In order to transmit the transfer data from the LSB in succession, at step S'48, the data "0" of the 1 bit column is initially set within the port Ps.

At step S'50, judgment is made as to whether or not the transfer bit data is "1" or "0", and according to the result, a signal of "H" or "L" is outputted at the next step S'52 or S'54, respectively. In this case, as the data of the 1 bit column is "0", a signal of "L" is outputted from the port Ps at step S'54.

At step S'56, by transmitting the 1 data bit, the content of register r1 is subtracted by 1, and at step S'58, judgement is made as to whether or not the content of the register is "0". This step is the stage having transmitted the data of the 1 bit column, and, in succession, in order to transmit the data "0" of the 2 bit column, the process from step S48 is repeated. In the case of transmitting the data "0" such as the 1 bit column, 3 bit column, 5 bit column and 7 bit column, the process of steps S'48, S'50, S'54, S'56 and S'58 is applied in sequence, and, in the case of transmitting the data "1" such as the 2 bit column, 4 bit column, 6 bit column and 8 bit column, the process of steps S'48, S'50, S'52, S'56 and S'58 is employed in succession.

Also, after transmitting the data of the 8 bit column, at step S'56, the register r1 is subtracted, and, if detecting the content of register r1 as being "0" at step S'58, the process proceeds to step S'60.

At step S'60, as the data bit indicating "80" is the ACK code, a signal of "1" is outputted into the AC/D. Also, at step S'62, a signal of "1" is outputted into the stop bit to finish the transmitting operation.

The operation of the watch-dog timer 3 will be explained hereinafter with reference to a timing chart of FIG. 5 and a real value table of FIG. 6.

After turning on the power source, the outputs of flip-flops 20 and 21 are insufficient to provide the output of oscillator 22 being "L". And, if the main CPU 1 is outputting the watch-dog strobe periodically the process of steps S36 and S38 or steps S72 and S74 under releasing the reset period of time immediately after turning on the power source, the flip-flop 20 detects the rising edge of the clock input CP1. At this time, the clear input CL1, preset input PR1 and data input D1 of the flip-flop 20 are all rendered to "L" and the $\bar{Q}$ output thereof becomes "H".

With the above, as the clear input CL2 of the flip-flop 21 becomes "H" and the preset input PR2 thereof is "L" at this time, the Q2 output of the flip-flop 21 is brought into "L". The NAND gate 23 is generating "H" under the Q2 output of flip-flop 21 being "L". Accordingly, the main CPU 1 is not brought into a reset state since the output of the comparator is "H". And, if the output of oscillator 22 is changed to "H", the preset input PR1 of flip-flop 20 becomes "H" to change the $\bar{Q}$ output thereof into "L".

Accordingly, since the clear input CL2 and preset input PR2 of the flip-flop 21 are both "L" and the data input D2 thereof is "H", the Q2 output thereof is adapted to change in response to the rising edge of clock input CP2. At this state, since, if the output of oscillator 22 is "H", the output of NAND gate 25 is "L" and the clock input CP2 is "L", the Q2 output of flip-flop 21 is maintained at "L".

Therefore, the main CPU 1 is not entered into the state or reset. When the output of the oscillator becomes "L", the output of the NAND gate 25 becomes "H" to cause the clock input CP2 of flip-flop 21 to be "H", to change the Q2 output to "H". However, since the output of oscillator 22 is "L", the NAND gate 23 is generating a signal of "H", and the main CPU 1 is not brought into the reset state. Also, if the main CPU 1 outputs a signal of "H" as a watch-dog strobe in a normal state, the flip-flop 20 detects the rising edge of the clock input CP1 and again changes the $\bar{Q}$ output thereof into "H".

With the above, the Q2 output of flip-flop 21 becomes "L", and the above operation is repeated again. Therefore, if the main CPU 1 is practicing the program normally to output the watch-dog strobe periodically, the output of the NAND gate 23 is kept at "H" and the main CPU 1 comes off the reset. However, if the main CPU 1 is caused to run away, the generation of the watch-dog strobe for constant intervals cannot be made. At this time, as the clock input CP1 of flip-flop 20 is maintained at "L", the Q1 output thereof is kept at "L". Also, the clear input CL2 of flip-flop 21 is "L", and the Q2 output thereof is rendered to change in response to the trigger edge of clock input CP2.

Accordingly, during the T1 period of time having the output of oscillator 22 being "L", the flip-flop 21 puts the Q2 output at "H" in response to the rising edge of clock input CP2. At this time, the NAND gate 23 is rendered to output "H" since the output of oscillator 22 is "L" and the Q2 output of flip-flop 21 is "H", and the main CPU 1 comes off the reset. However, the NAND gate 25 changes it output to "L" from the time point t providing the output oscillator 22 being "H", and the flip-flop 21 is detected with the rising edge of clock input CP2, but retains the Q2 output at "H" since the clear input CL2 is "L" and the preset input PR2 is "L" at this time. Also, since the output of oscillator 22 is "H" and the Q2 output of flip-flop 21 is "H", the NAND gate 23 is rendered to output "L", and the voltage at the connection point A is lower. Therefore, since the divided voltage by the resistors R2 and R3 and the divided voltage by the resistors R4 and R5 to be disposed at the point a with respect to the voltage VA drop below the zener voltage VZ, the comparators 5 and 6 output "L", respectively.

Accordingly, the main CPU 1 is reset by providing "L" at the reset terminal R. Also, within the period of time providing the output of oscillator 22 being "H", the main CPU 1 is caused to enter into the reset state, and, after releasing the reset, the initialized main CPU 1 is adapted to begin the practice of normal order from the given absolute address, as a result of return from the state of runaway. If the output of the comparator 6 becomes "L", the transistor 8 is turned off, and the power supply from the stable power source circuit 13 to the reset line of each slave CPU $2_1, \ldots 2_n$ is stopped.

Accordingly, the slave CPUs $2_1, \ldots 2_n$ as well as the main CPU 1 are rendered to reset, respectively. Also, if the transistor 8 is turned on by the reset release of the main CPU 1 to supply power to the reset line again, the slave CPUs $2_1, \ldots 2_n$ are adapted to release the reset after a certain time to be delayed by the integral circuit 24, and begin the practice of normal order from the given absolute address.

Although the interval of the watch-dog strobe is rendered in coincidence with the output period of oscillator 22 for the purpose of facilitating the understanding in the above timing chart, the watch-dog strobe is adapted to output with a period much shorter than that of the oscillator 22 in practical use.

As is clear from the foregoing description, according to the present invention, there is provided a resetting system having a plurality of slave microcomputers for each of the terminals with respect to one main microcomputer. The main microcomputer is provided with a breakdown detection means to detect a breakdown when the program of the main microcomputer runs away. The slave microcomputers are designed to release resetting through the power supply from a power source for releasing the resetting.

In the resetting system according to the present invention, it is so arranged that, when the slave microcomputers are not turned into a data transfer mode even though the main microcomputer designates the data transfer mode, the main microcomputer controls to stop the power supply from the reset release power source to the slave microcomputers, and accordingly, the main microcomputer is reset for a predetermined time as a result of the detection of the above-described breakdown by the breakdown detection means, and at the same time, the slave microcomputers are reset since the power supply from the reset release power source is interrupted for a predetermined time period.

Therefore, according to the present invention, the resetting system comprises a main microcomputer which controls the whole system and slave microcomputers which effect processing at each terminal, wherein resetting is achieved primarily by the main microcomputer, with no necessity for a breakdown detection means to be provided in each of the slave microcomputers, thus reducing system cost. Moreover, in the case of a breakdown observed in the main microcomputer, the power supply from the reset release power source to the slave microcomputers is stopped by the breakdown detection means which is disposed only in the main microcomputer, so that the slave microcomputers can be reset with high reliability.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A resetting system in an apparatus provided with a main CPU for controlling the whole apparatus and a plurality of slave CPUs each controlling a respective terminal portion of the apparatus to be controlled, the main CPU and said slave CPUs being connected through a common transmission line through which response data is sent from a particular slave CPU to the main CPU as a result of the main CPU sending a command including an address code to address said particular slave CPU, the system comprising:
   a programming unit provided in the main CPU, including means for
      outputting strobe signals at a given period of time,
      determining the existence of communication errors when the response data is not sent in accordance with a predetermined format, and
      outputting a first reset signal when a predetermined number of communication errors are generated in succession;
   a watch-dog timer for receiving the strobe signals and outputting a second reset signal upon the absence of said strobe signals;
   main CPU reset means for resetting the main CPU in response to the outputting of the second reset signal; and
   slave CPU reset means for resetting said plurality of slave CPUs in response to the outputting of either the first reset signal or the second reset signal.

2. The system as defined in claim 1, wherein said communication error determining means judges as a communication error, the absence of response data sent back from said particular slave CPU to the main CPU when the main CPU has sent a command to said particular slave CPU.

3. The system as defined in claim 2, wherein both the main CPU and slave CPU communicate the command and response data in series.

4. The system as defined in claim 3, wherein the command and response data to be communicated includes a pair of a start bit at the beginning and a stop bit at the end of the command and response data, in order to transmit the command and response data asynchronously.

5. The system as defined in claim 4, wherein said communication error determining means judges as a communication error, the absence of said start bit upon receiving said particular response data from the slave CPU.

6. The system as defined in claim 4, wherein said communication error detecting means judges as a communication error, the absence of said stop bit upon receiving said particular response data from the slave CPU.

7. The system as defined in claim 4, wherein the command and response data further include a control bit for identifying whether data to be communicated is the command or the response data.

8. The system as defined in claim 7, wherein said communication error detecting means judges as a communication error, the reception of a control bit shown as a command from said particular slave CPU.

* * * * *